United States Patent [19]

Rexroad et al.

[11] 4,281,227
[45] Jul. 28, 1981

[54] DRAWOUT SWITCHGEAR WITH BLOW-OUT PREVENTION DEVICE

[75] Inventors: James O. Rexroad, Beaver; John P. Majcher, Chippewa Twp., Beaver County, both of Pa.

[73] Assignee: Westinghouse Electric Corp., Pittsburgh, Pa.

[21] Appl. No.: 33,061

[22] Filed: Apr. 25, 1979

[51] Int. Cl.³ .............................................. H01H 9/20
[52] U.S. Cl. ........................... 200/50 AA; 339/273 R; 361/336
[58] Field of Search ............... 200/50 AA, 301; 339/217 R, 273 R; 361/331–345

[56] References Cited

U.S. PATENT DOCUMENTS

| 2,762,878 | 9/1956 | Wills | 200/5 AA |
|---|---|---|---|
| 3,491,331 | 1/1970 | Glader | 339/273 R |
| 3,562,593 | 2/1971 | Bould | 361/342 |
| 3,818,281 | 6/1974 | Ferton et al. | 200/50 AA |

Primary Examiner—S. J. Witkowski
Assistant Examiner—Morris Ginsburg
Attorney, Agent, or Firm—L. P. Johns

[57] ABSTRACT

A drawout switchgear with blow-out prevention means characterized by a circuit breaker movable into and out of a cell, and detachable blockage means for holding the circuit breaker in place.

1 Claim, 5 Drawing Figures

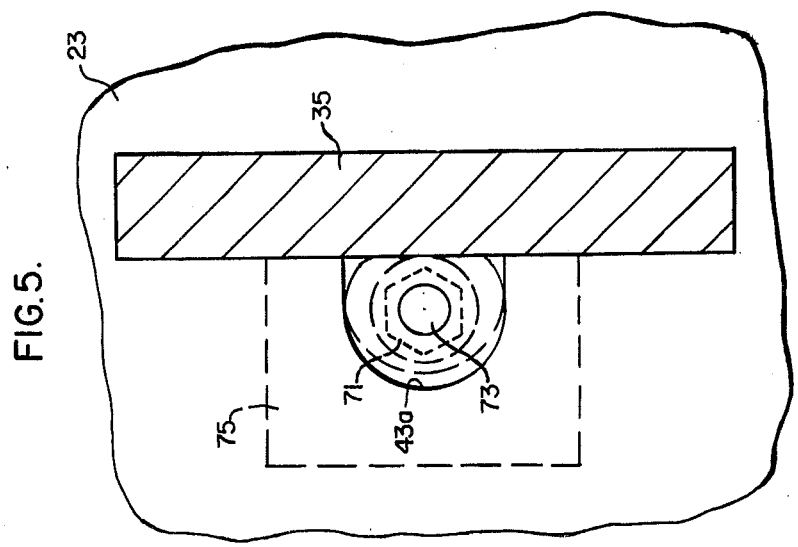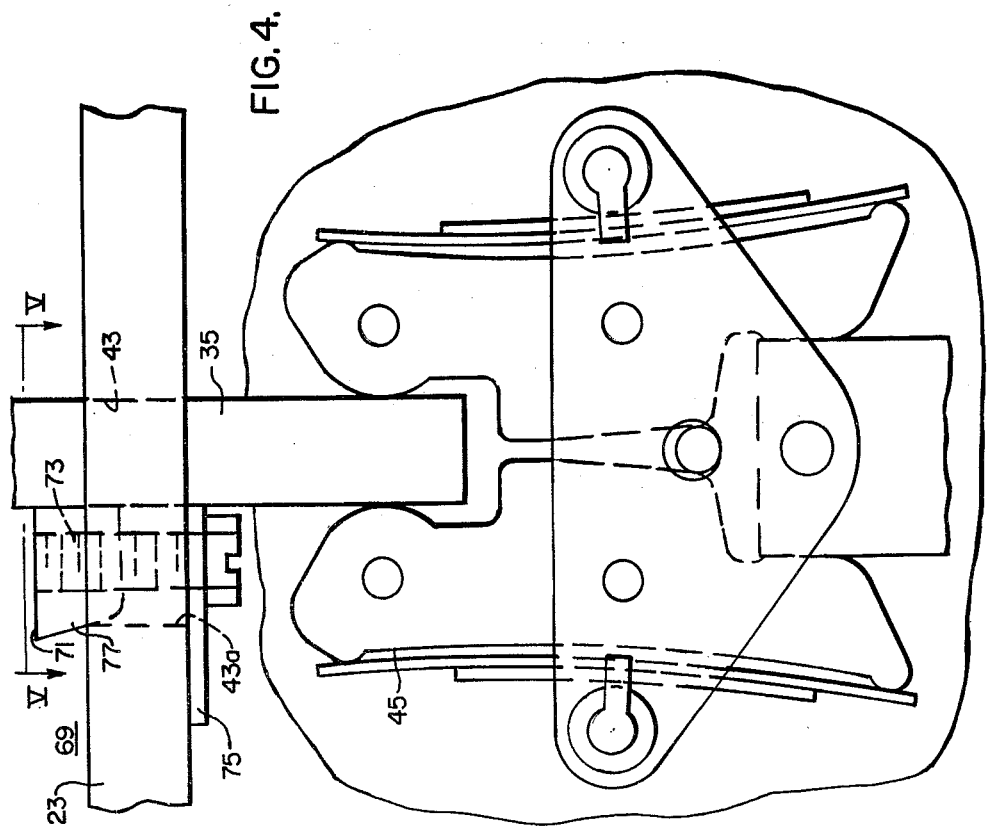

DRAWOUT SWITCHGEAR WITH BLOW-OUT PREVENTION DEVICE

BACKGROUND OF THE INVENTION

1. Field of the Invention

This invention relates to drawout switchgear.

2. Description of the Prior Art

When circuit breakers are mounted in cells and drawout switchgear, the breakers provide a disconnect between the line and load bus bars. As is well known, drawout circuit breakers are held in place against normal short circuits by cams which ordinarily draw the breaker into position within a cell. When very high magnetic forces occur due to high fault currents, the cams are often unable to prevent a circuit breaker from moving away from the load terminal stabs. Indeed, the magnetic forces incurred sometimes blow a circuit breaker away from the terminal stabs.

Associated with the foregoing is the occurrence of strong vibrations between the terminal stabs due to high short circuit currents. Under such conditions terminal stabs may vibrate and move sufficiently to cause arcing and other damage.

SUMMARY OF THE INVENTION

In accordance with this invention it has been found that the foregoing problems may be overcome by providing a drawout switchgear comprising a cell having a front opening and rear wall, the rear wall comprising slots, stationary terminal stabs extending through the slots into the cell, a circuit interrupting unit movable into and out of the cell, movable terminal means on the unit and electrically connected to the stationary terminal stabs when the unit is in the cell, stop means releasably mounted between the cell and the unit for preventing the unit from being blown out of the cell due to high-magnetic forces occurring in phase conductors within the unit, the stop means comprising at least one clamp pivotally mounted on one of the cell and unit for rotation into and out of the path of movement of the unit within the cell, the stop means also comprising clamp-engaging members on the front surface of the unit, vibration dampeners detachably mounted in the slot between the stab and the rear wall for reducing vibration between the stabs and the vibration dampener comprising a wedge-shaped nut and bolt assembly.

The advantage of the device of this invention is that it eliminates or greatly minimizes damage to circuit breakers and associated parts which otherwise occurs when high-fault currents flow through the circuit breaker.

BRIEF DESCRIPTION OF THE DRAWING

FIG. 4 is an enlarged fragmentary view of the vibration dampening device between a stab and a rear wall of a cell; and FIG. 5 is a vertical sectional view taken on the line V—V of FIG. 4.

DESCRIPTION OF THE PREFERRED EMBODIMENTS

Figure 1:
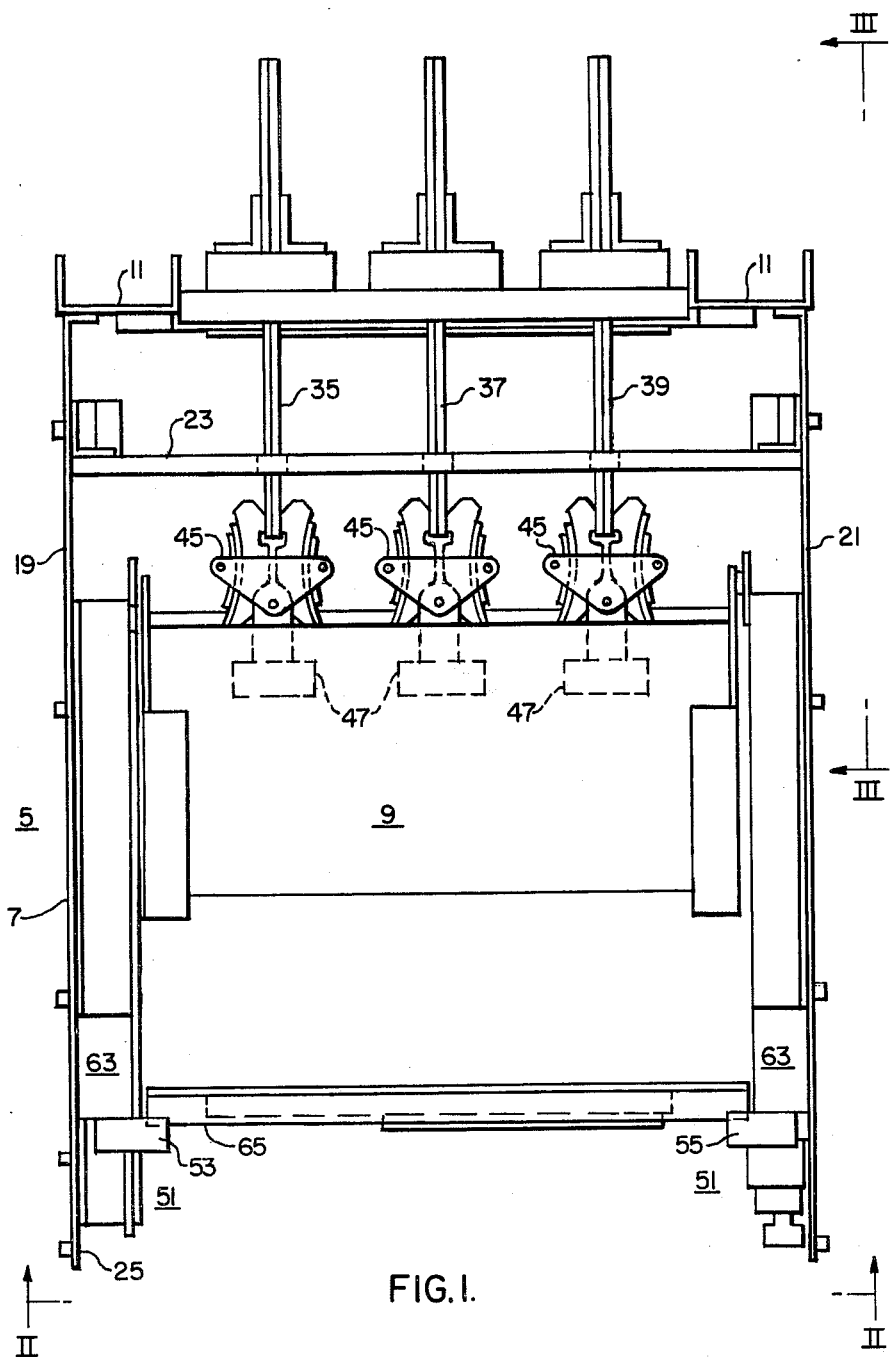
FIG. 1 is a plan view of a drawout switchgear assembly in accordance with this invention.

In FIG. 1 a drawout switchgear is generally indicated at 5 and it comprises a cell 7 and a circuit interrupting unit 9.

Figure 2:
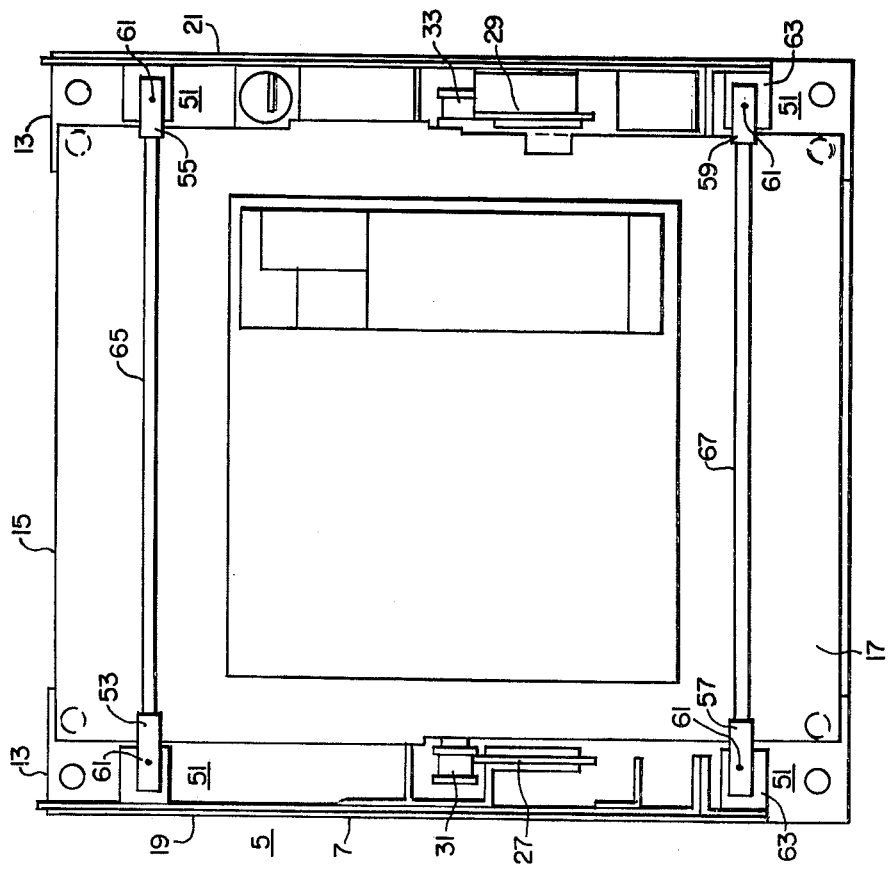
FIG. 2 is an elevational view taken on line II—II of FIG. 1.

The drawout switchgear 5 is similar in construction and operation to that disclosed in U.S. Pat. Nos. 4,112,269; 4,121,067 and 4,139,748, which are incorporated by reference as part hereof. Because of the full disclosure in those patents, the description of the drawout switchgear is limited herein to the basic structure and operation. The cell 7 comprises a support frame including a pair of similar vertical channels 11 at the rear (FIG. 1), a pair of horizontal angles 13 at the front (FIG. 2), interconnecting horizontal members 15, 17, and opposite side walls 19, 21. A vertical back wall 23 extends between the opposite side walls 19, 21. A front opening 25 affords access to the cell and the opening is normally closed by a door (not shown). A spaced tracks 27, 29 are disposed at the inside surfaces of the side walls 19, 21 to provide support wheels 31, 33.

The circuit interrupting unit or circuit breaker 9 is contained within a molded housing composed of a high-strength phenolic resin re-enforced with glass fiber. As shown in FIG. 1, upper terminals or stabs 35, 37, 39 for line conductors are connected to vertical bus bars (not shown) and extend through similar slots 43 in the back wall 23. Lower terminals or stabs (one of which is shown at 41 in FIG. 3) for load conductors are disposed below the upper stabs. Thus, circuit breaker 9 comprises similar terminal connectors 45 which are detachably connected to the stabs 35, 37, 39 (FIG. 1) when the circuit breaker 9 is completely installed within the cell 7. The circuit breaker 9 comprises the wheels 31, 33 for rolling the unit into and out of the cell 7 in a conventional manner, and it also comprises a circuit breaking mechanism of a conventional type and generally indicated at 48.

Figure 3:
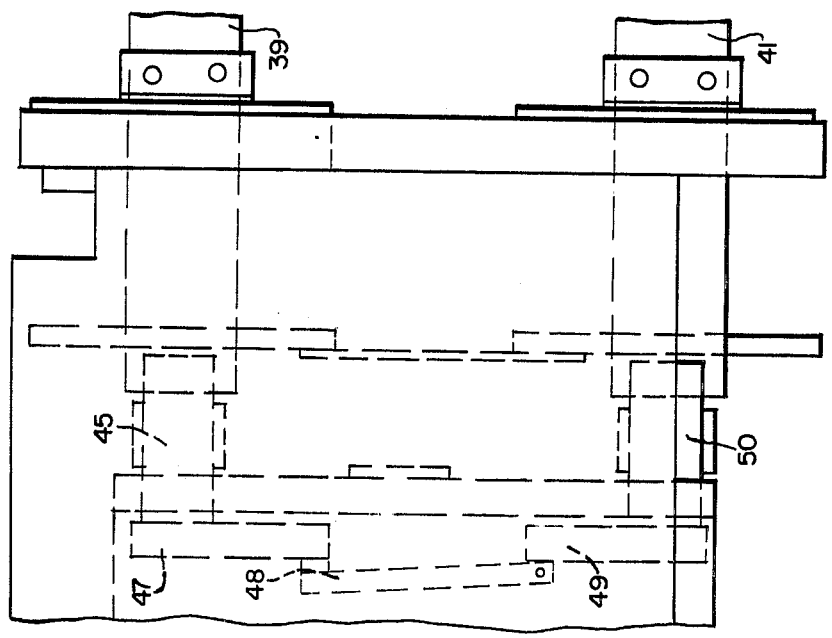
FIG. 3 is a fragmentary side view taken on the line III—III of FIG. 1.

As shown in FIG. 3, the circuit through the circuit breaker 9 extends through the line stab, 39, the upper connector 45, a conductor 47, circuit breaker mechanism 48, a conductor 49, the lower connector 50, and to load stab 41. When short circuits occur in the system, increased magnetic forces are generated at the circuit breaker conductors 47, 49. Since the conductors 47, 49 are secured at angles to the connectors 45, 50, the current changes directions and the increased magnetic forces would ordinarily move the conductors into alignment with the axes of the respective connectors 45, 50. The resulting reaction is that the circuit breaker moves away from the stabs 39, 41 and separate the connectors from the stabs.

In accordance with this invention, stop means, generally indicated at 51, are provided for the circuit breaker 9 in place. The stop means 51 comprises a plurality, such as four, clamps 53, 55, 57, 59, which are pivotally mounted on similar pivots 61, which clamps are mounted on similar blocks 63 which, in turn, are secured on the cell 7 adjacent to the inner surfaces of the side walls 19, 21. The clamps 53–59 are rotatable between clamped and unclamped positions, or into and out of the path of movement of the circuit interrupting unit 9. In the clamped position the clamps 53–59 extend over portions of the front wall of the unit 9, whereby they block the unit from moving as set forth above.

In addition, a pair of stop bars 65, 67, are disposed horizontally across the front of the unit 9 at the upper and lower sides thereof. The end portions of the stop bars 65, 67 are in overlapping engagement with the corresponding clamps 53–59 when the clamps are in the clamped position, thereby re-enforcing the unit 9 and distributing any blow-out force over the area of the front panel of the unit.

Although the clamps are shown pivotally mounted on the cell, such as the blocks 63 on the cell, it is understood that a reverse mounting condition may exist. In another embodiment the clamps 53–59 may be pivotally mounted on the circuit interrupting unit 9 and be rotated between clamping and unclamping positions with respect to a clamp-engaging surface, such as provided in a clamp-receiving notch (not shown), on the respective blocks 63.

When high short-circuit or fault currents occur, the stabs 35, 37, 39 may vibrate excessively within the slots 43 of the back wall 23, thereby causing excessive damage to the terminal connectors 45, 50, such as bending the metal part, or burning the parts due to arcing. To prevent excessive vibration, a vibration dampener generally indicated at 69 (FIGS. 4 and 5), is provided within the slot 43. For that purpose each slot 43 includes a smaller laterally-extending slot portion 43a in which a vibration dampener 69 is disposed. The dampener comprises a wedge-shaped nut 71, a bolt 73, and a washer 75. The nut 71 comprises an inclined surface 77 which when tightened into place by the bolt 73 rides into the slot portion 43 and bears against the stab 35 to hold it snugly against the opposite side of the slot 43. Thus, the stab 35 is secured against the back wall 23 in a vibration-free manner.

In conclusion, the device of this invention provides means for eliminating or diminishing the damaging effects of high-magnetic forces occurring as a result of high-fault currents and the like.

What is claimed is:

1. Drawout switchgear comprising a cell having a front opening, a circuit interrupting unit movable into and out of the cell, stationary terminal means supported in the cell, movable-terminal means on said unit and in electrical engagement with the stationary terminal means when the unit is in the cell, stop means releasably mounted between the cell and the unit for preventing the unit from moving out of place when high magnetic forces occur, the stop means comprising at least two clamps pivotally mounted on the cell and movable into and out of the path of movement of the unit within the cell, and the stop means also comprising clamp-engaging stop bars on the front surface of the unit and detachably mounted between corresponding clamps.

* * * * *